United States Patent
Yang

[11] Patent Number: 6,125,721
[45] Date of Patent: Oct. 3, 2000

[54] TORQUE TRANSMITTING DEVICE FOR POWER TOOL

[76] Inventor: Ah Mi Yang, P.O. Box 63-99, Taichung 406, Taiwan

[21] Appl. No.: 09/306,660

[22] Filed: May 5, 1999

[51] Int. Cl.[7] ........................................................ B25F 1/02
[52] U.S. Cl. ............................ 81/57.29; 81/57; 81/177.4; 81/490
[58] Field of Search ......................... 81/57, 57.11, 57.12, 81/57.13, 57.28, 57.29, 177.4, 490

[56] References Cited

U.S. PATENT DOCUMENTS

| | | | |
|---|---|---|---|
| 1,024,151 | 4/1912 | Smith | 81/57.29 X |
| 3,932,904 | 1/1976 | Nilsson et al. | 81/57.11 X |
| 4,462,282 | 7/1984 | Biek | 81/57.11 |
| 4,470,328 | 9/1984 | Landis | 81/57.29 X |
| 5,052,496 | 10/1991 | Albert et al. | 81/57.13 X |
| 5,063,796 | 11/1991 | Gennep | 81/57.29 |
| 5,174,178 | 12/1992 | Disston, Jr. | 81/490 |
| 5,421,225 | 6/1995 | Chen | 81/490 |

*Primary Examiner*—David A. Scherbel
*Assistant Examiner*—Anthony Ojini

[57] ABSTRACT

A torque transmitting device for a power tool includes a housing having two tubes bent relative to each other. A tool extension and a shaft are rotatably secured to the tubes and coupled together with helical gears. The tool extension is coupled to and driven by the power tool. A handle is selectively secured to either sides of the housing according to the right-handed or left-handed persons' needs. The handle includes two or more grooves for solidly receiving the tool bits. A cap is secured to the handle and has a screw driver bit for driving fasteners.

7 Claims, 4 Drawing Sheets

6,125,721

TORQUE TRANSMITTING DEVICE FOR POWER TOOL

BACKGROUND OF THE INVENTION

1. Field of the Invention

The present invention relates to a torque transmitting device, and more particularly to a torque transmitting device for a power tool.

2. Description of the Prior Art

Typical power angle drivers or typical torque transmitting devices for power tools comprise a cylindrical housing having a tool extension extended from one end thereof and coupled to a power tool for receiving the torque or for being driven by the power tool. A driving stem is rotatably secured in the cylindrical housing and has one end extended outward of the housing for engaging with and for driving the fasteners. A clutch device or a torque adjusting controller is disposed between the driving stem and the extension for adjusting the power output of the driving stem. However, the extension and the driving stem are aligned with each other such that the driving stem may not be driven to rotate in different angular position relative to the extension. In addition, none of the prior torque transmitting devices provide a handle that may be adjustably secured thereto.

The present invention has arisen to mitigate and/or obviate the afore-described disadvantages of the conventional torque transmitting devices.

SUMMARY OF THE INVENTION

The primary objective of the present invention is to provide a torque transmitting device for a power tool having a driving stem inclined or perpendicular relative to the extension of the power tool. The handle may be selectively or adjustably secured to the torque transmitting device.

In accordance with one aspect of the invention, there is provided a torque transmitting device for a power tool comprising a housing including a first tube and a second tube bent relative to each other, a tool extension rotatably secured to the first tube of the housing and driven by a power tool, a shaft rotatably secured to the second tube of the housing and coupled to the tool extension, and a handle selectively securing to the housing according to the right-handed persons or the left-handed persons' need.

A sleeve is secured in the first tube of the housing and has a bore formed therein for rotatably receiving the tool extension. The tool extension includes a first helical gear secured thereon and located in the housing, the shaft includes a second helical gear secured thereon and engaged with the first helical gear of the tool extension for allowing the shaft to be driven by the tool extension.

The first tube of the housing includes a peripheral portion having at least two screw holes formed therein, the handle includes a bolt extended therefrom and engaged with either of the screw holes of the first tube for selectively securing the handle to the first tube of the housing. The sleeve includes a slot, and the bolt of the handle is engaged into the slot of the sleeve for solidly securing the handle to the first tube and the sleeve. The sleeve includes a key engaged with the first tube for preventing the sleeve from rotating relative to the first tube.

The handle includes a free end having at least two grooves formed therein and communicating with each other for receiving tool bits therein and for preventing the tool bits from being contacted with each other. The handle includes at least two cusps extended inward of the grooves for separating the tool bits from each other.

A cap includes at least two studs extended therefrom and engaged into the grooves of the handle. The cap includes a recess formed therein and includes a screw driver bit extended therefrom and extended inward of the recess of the cap for engaging with and for driving fasteners.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 3:
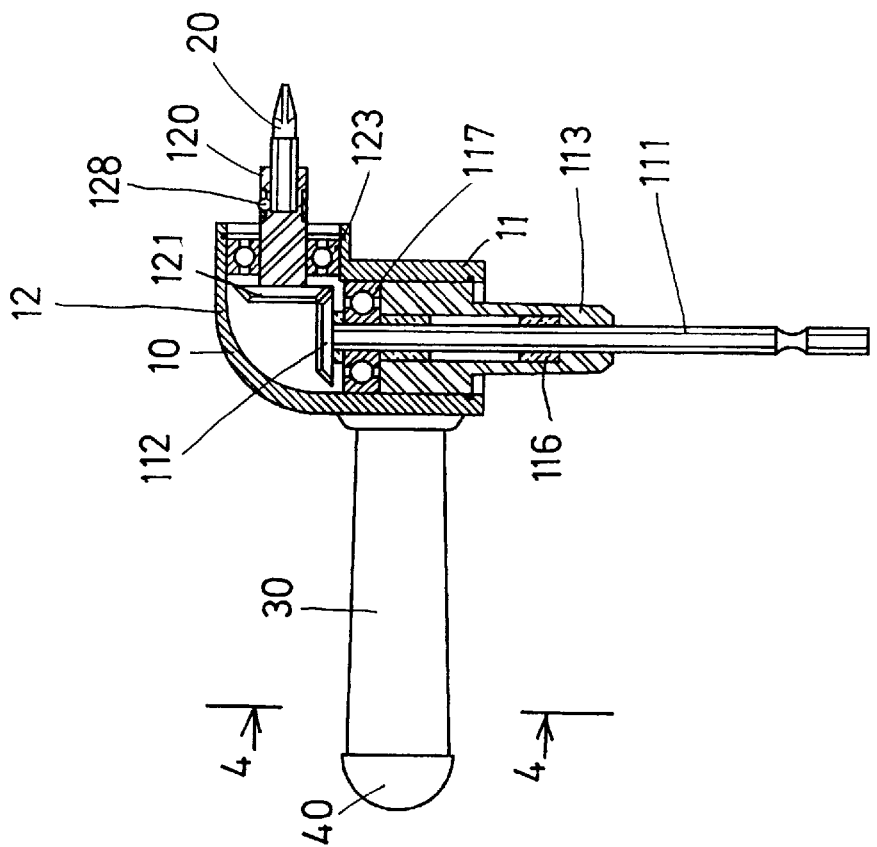
FIG. 3 is a cross sectional view of the torque transmitting device, taken along lines 3–3 of FIG 1.
Figure 1:
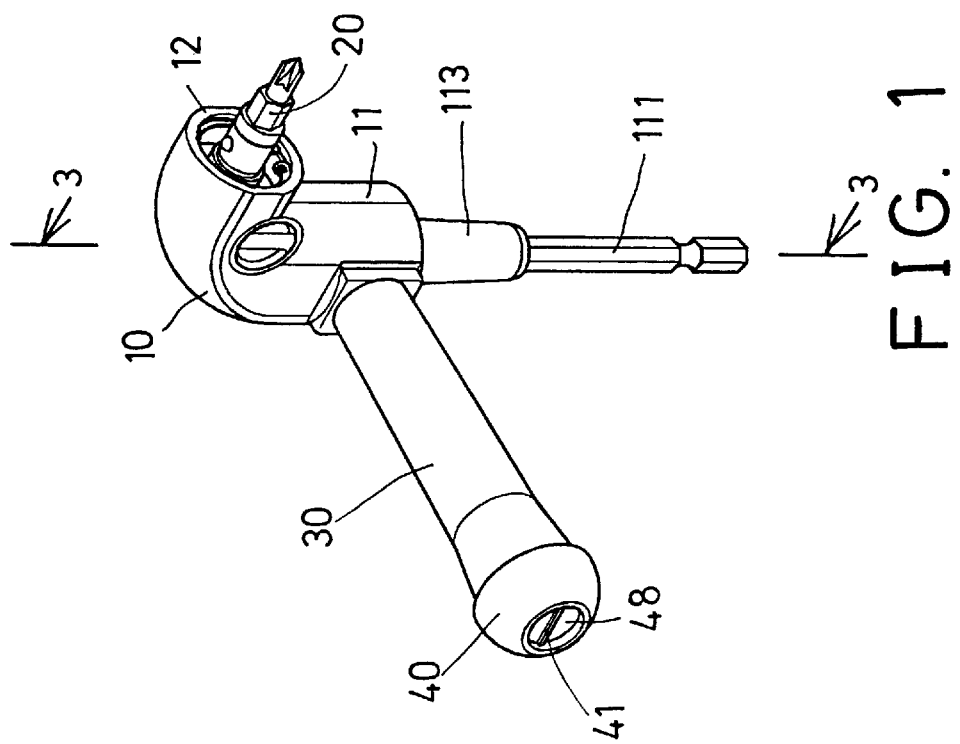
FIG. 1 is a perspective view of a torque transmitting device in accordance with the present invention.
Figure 2:
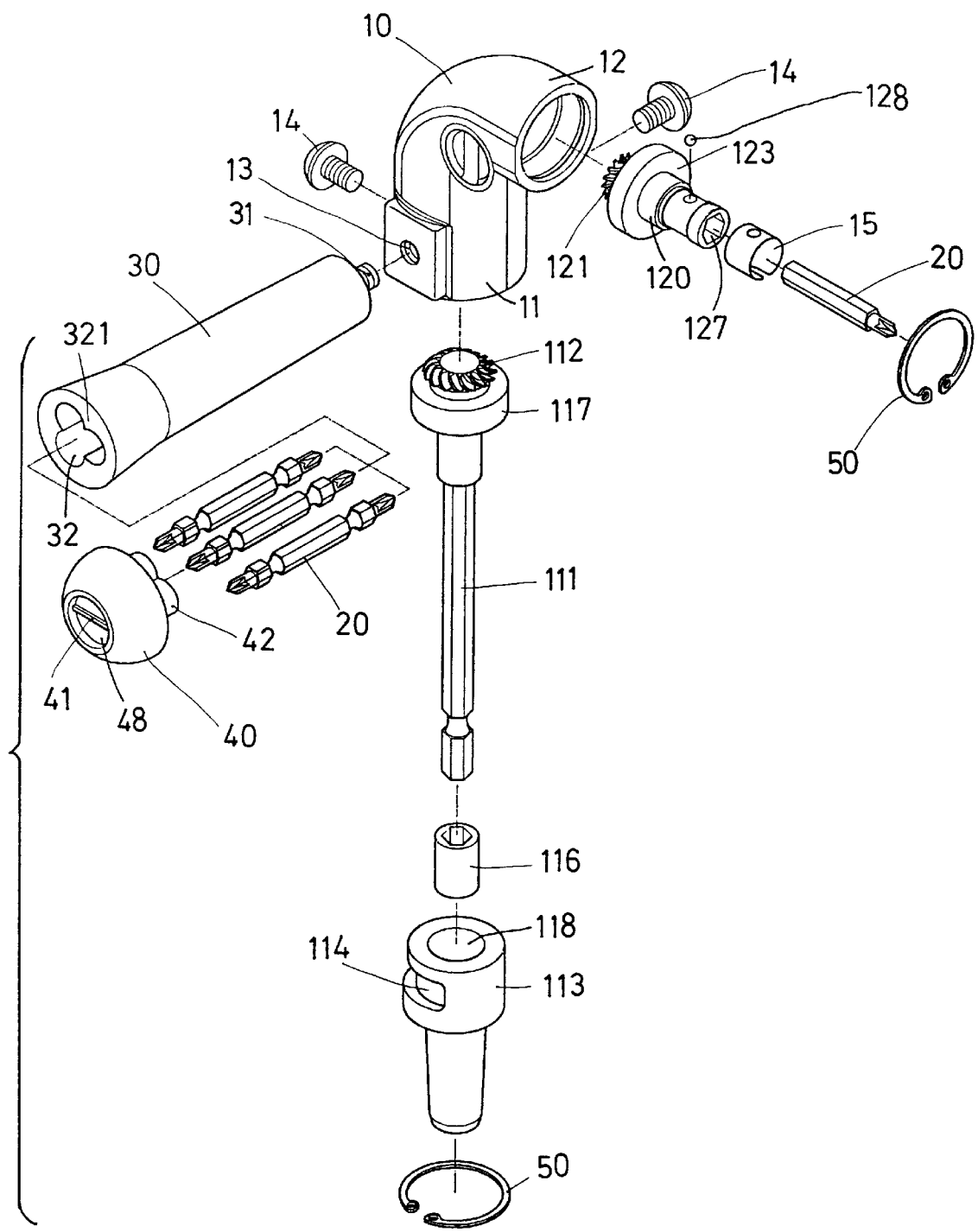
FIG. 2 is an exploded view of the torque transmitting device.
Figure 5:
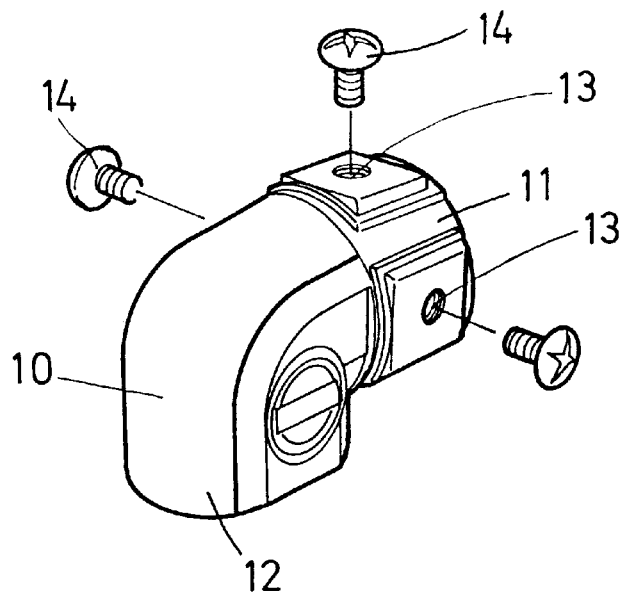
FIG. 5 is a partial exploded view of a housing and fasteners.

Referring to the drawings, and initially to FIGS. 1–3, a torque transmitting device in accordance with the present invention comprises a housing 10 including an elbow-shape having two cylindrical tubes 11, 12 bent relative to each other or arranged in a suitable inclination relative to each other or perpendicular to each other. The tube 11 includes one or more screw holes 13 formed in the peripheral portion thereof for engaging with the fasteners 14 (FIG. 5). A tool extension 111 includes a lower end for coupling to a power tool and for allowing the tool extension 111 to be driven and rotated by the power tool, and includes an upper end rotatably secured in the tube 11 with a bearing 117 and includes a bevel gear or a helical gear 112 secured on top thereof and received in the tube 11. A sleeve 113 includes a bore 118 formed therein for rotatably receiving the tool extension 111 therein. A bushing or a bearing 116 is engaged between the extension 111 and the sleeve 113 for rotatably securing the extension 111 in the sleeve 113. A retaining ring 50 is secured to the free end portion of the tube 11 for securing the sleeve 113 and the extension 111 in the tube 11. The fasteners 14 are threaded with the screw holes 13 of the tube 11 and engaged with the sleeve 113 for solidly securing the sleeve 113 to the tube 11.

A shaft 120 has one end rotatably received in the tube 12 with a bearing 123 and includes a bevel gear or a helical gear 121 secured on one end thereof and received in the tube 12 and engaged with the helical gear 112 of the extension 111 such that the shaft 120 may be driven and rotated by the power tool via the extension 111 and the helical gears 112, 121. The other end of the shaft 120 includes an engaging hole 127 formed therein for receiving a tool extension or a tool bit 20 or for directly engaging with a fastener therein. A spring ring 15 is engaged on the shaft 120 and engaged with a projection 128 for biasing the projection 128 to engage with the tool bit 20 and for forming a spring biased projection to secure the tool bit 20 in place. A retaining ring 50 is secured to the free end portion of the tube 12 for securing the shaft 120 in the tube 12.

Figure 4:
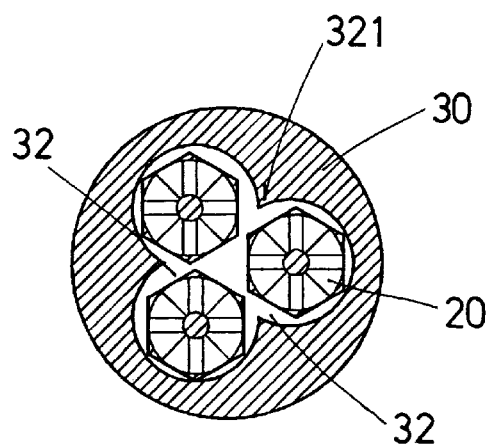
FIG. 4 is a cross sectional view taken along lines 4–4 of FIG. 3.
Figure 6:
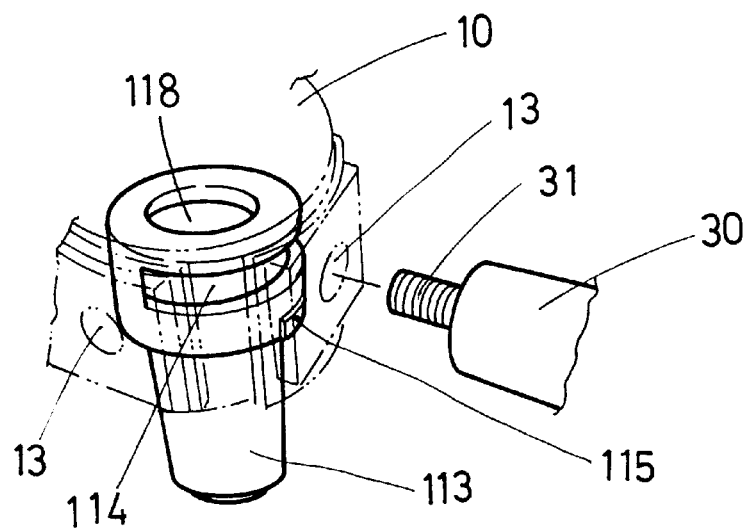
FIG. 6 is a partial exploded view illustrating the coupling of a handle to the housing.

A handle 30 includes a bolt 31 extended from one end thereof for threading with either of the screw holes 13 of the tube 11 and for securing the handle 30 to the tube 11 (FIGS. 1, 6). As shown in FIGS. 2, 6, the sleeve 113 includes a slot 114 laterally formed therein. The bolt 31 of the handle 30 may be engaged into the slot 114 of the sleeve 113 for allowing the handle 30 to be solidly secured to the tube 11 and the sleeve 113 and for further preventing the sleeve 113 from being disengaged from the tube 11. The lateral slot 114 includes a suitable width for allowing the bolt 31 of the handle 30 to be easily engaged into the slot 114. As shown in FIG. 6, the sleeve 113 includes a key 115 engaged into a corresponding depression of the tube 11 for keying the sleeve 113 to the tube 11 and for further preventing the sleeve 113 from rotating relative to the tube 11. The handle 30 includes one or more grooves 32 formed in the free end thereof opposite to the bolt 31 and communicating with each other and for forming one or more cusps 321 extending inward of the grooves 32 and for allowing the tool extensions or tool bits 20 to be received in the grooves 32 of the handle 30 (FIG. 4) and for preventing the tool bits 20 from engaging with or contacting with each other. The tool bits of the typical tool devices may be contacted with each other and may generate a great noise when the tool device is driven by the power tool.

Figure 7:
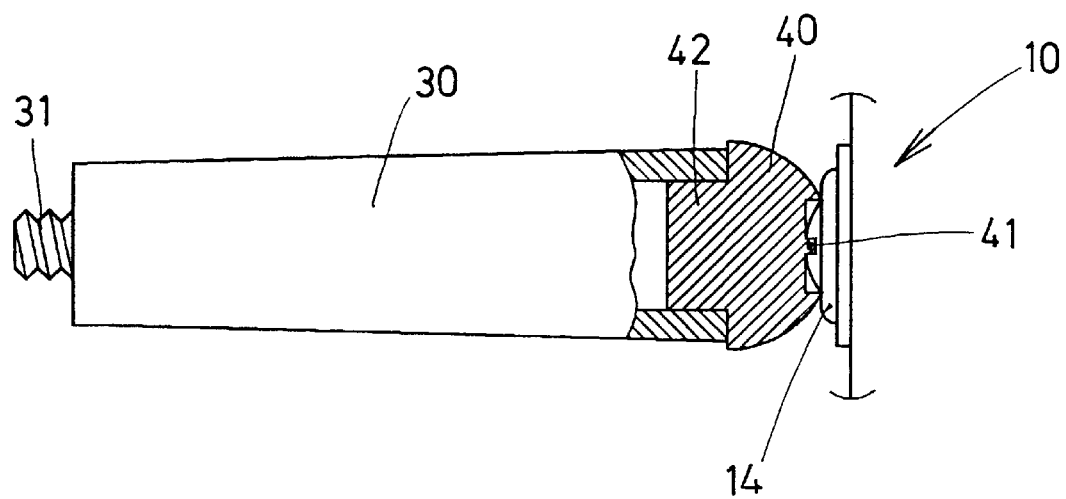
FIG. 7 is a partial cross sectional view illustrating the operation of the torque transmitting device.

A cap 40 includes one or more studs 42 extended from one end thereof and engaged into the grooves 32 of the handle 30 for retaining the tool bits 20 in place. The cap 40 includes a recess 48 formed in the other end thereof opposite to the studs 42 and includes a screw driver bit 41 extended inward of the recess 48 for engaging with and for driving the fasteners 14 (FIG. 7) to secure the sleeve 113 in place. The screw driver bit 41 of the cap 40 of the handle 30 may be used for driving the fasteners 14 first before the bolt 13 of the handle 30 is threaded with the other screw hole 13 of the tube 11 to secure the handle 30 to the tube 11.

It is to be noted that the handle 30 may be threaded with either of the screw holes 13 for securing the handle 30 to any suitable direction relative to the housing 10 such that the handle 30 may be easily operated by either the right-handed persons or the left-handed persons. The tool bits 20 received in the grooves 32 of the handle 30 may be stably retained in place and may be prevented from being hit with each other. The screw driver bit 41 of the cap 40 may be used for driving the fasteners 14 before the handle 30 is secured to the tube 11 of the housing 10. The extension 111 is not necessarily perpendicular with the shaft 120 and the tool bit 20, but may be included relative to the shaft 120 and the tool bit 20 that is coupled to the shaft 120.

In operation, as shown in FIGS. 1 and 3, the tool extension 111 may be coupled to the power tool for being driven by the power tool. The user may hold the handle 30 and may easily engage the tool bit 20 with the fasteners to be driven.

Accordingly, the torque transmitting device in accordance with the present invention includes a driving stem inclined or perpendicular relative to the extension that is coupled to the power tool. The handle may be selectively or adjustably secured to the torque transmitting device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A torque transmitting device for a power tool, said torque transmitting device comprising:

a housing including a first tube and a second tube bent relative to each other;

a sleeve secured in said first tube of said housing and including a bore formed therein, said sleeve including a slot formed therein;

a tool extension rotatably received in said bore of said sleeve for rotatably securing to said first tube of said housing, said tool extension being coupled to the power tool for receiving a torque from the power tool and for being driven by the power tool, said tool extension including a first helical gear secured thereon and located in said housing;

a shaft rotatably secured to said second tube of said housing, said shaft including a second helical gear secured thereon and engaged with said first helical gear of said tool extension for coupling said tool extension to said shaft and to drive said shaft; and a handle including a bolt extended therefrom and threaded through said first tube and engaged into said slot of said sleeve for selectively securing said handle to said first tube of said housing and for preventing said sleeve from being disengaged from said first tube of said housing.

2. The torque transmitting device according to claim 1, wherein said first tube of said housing includes a peripheral portion having at least two screw holes formed therein for selectively threading with said bolt of said handle.

3. The torque transmitting device according to claim 1, wherein said sleeve includes a key engaged with said first tube for preventing said sleeve from rotating relative to said first tube.

4. The torque transmitting device according to claim 1, wherein said handle includes a free end having at least two grooves formed therein and communicating with each other for receiving tool bits therein and for preventing the tool bits from being contacted with each other.

5. The torque transmitting device according to claim 4, wherein said handle includes at least two cusps extended inward of said at least two grooves for separating the tool bits from each other.

6. The torque transmitting device according to claim 4, further comprising a cap including at least two studs extended therefrom and engaged into said at least two grooves of said handle.

7. The torque transmitting device according to claim 6, wherein said cap includes a recess formed therein and includes a screw driver bit extended therefrom and extended inward of said recess of said cap.

* * * * *